United States Patent

[11] 3,580,085

| [72] | Inventor | Alan L. Hitzelberger<br>Grand Blanc, Mich. |
|---|---|---|
| [21] | Appl. No. | 829,585 |
| [22] | Filed | June 2, 1969 |
| [45] | Patented | May 25, 1971 |
| [73] | Assignee | General Motors Corporation<br>Detroit, Mich. |

[54] POINTER STABILIZER
1 Claim, 3 Drawing Figs.

[52] U.S. Cl. .................................................. 73/496,
73/430, 116/136.5, 116/116
[51] Int. Cl. ......................................................... G01p 1/08,
G01d 11/10
[50] Field of Search.......................................... 73/414,
496, 526, 430; 324/125; 116/116, 136.5

[56] References Cited
UNITED STATES PATENTS

| 1,679,203 | 7/1928 | Blackburn.................... | 73/496 |
|---|---|---|---|
| 2,884,238 | 4/1959 | Renz.............................. | 73/526 |
| 3,330,162 | 7/1967 | Powell........................... | 73/496 |
| 3,393,568 | 7/1968 | Miles et al. .................. | 73/496 |

FOREIGN PATENTS

| 652,130 | 4/1951 | Great Britain................ | 73/414 |

*Primary Examiner*—James J. Gill
*Assistant Examiner*—Herbert Goldstein
*Attorneys*—S. Carter and P. A. Taucher

ABSTRACT: The invention relates to a speedometer. The following specification describes a speedometer having an improved indicating mechanism. The hub of the indicating needle is machined to act as a bearing on the spindle, and the needle and spindle are interconnected by a damping member to filter out oscillations occurring in the pointer.

PATENTED MAY 25 1971　　3,580,085

INVENTOR.
Alan L. Hitzelberger
BY
P. A. Tucker
ATTORNEY

POINTER STABILIZER

The present invention relates generally to a speedometer of the magnetic type and, more particularly, to a system for filtering out oscillations in the pointer.

In general, a magnetic-type speedometer comprises a rotatable permanent magnet encircled by a speed cup secured to a spindle having an attached pointer. The magnet is connected to and is rotatably driven by the vehicle transmission or front wheel through a flexible cable. As the magnet revolves within the speed cup, the magnetic field of the magnet exerts a pull or magnetic drag on the speed cup, making it revolve in the same direction. Speed cup deflection is proportional to the speed at which the magnet is being revolved, with the stabilization point being the point where, at constant rotational velocity, the magnetic drag is just balanced by the retarding force created by a biasing spring attached to the indicator spindle. Obviously, if the angular velocity varies, then the pointer position will vary. However, the drive cable together with the magnet will produce a second order torsional system with a particular natural frequency which is transmitted through the spindle on the speedometer to the pointer needle. When the vehicle is driven at this frequency, the magnet will oscillate with enough angular displacement to cause pointer oscillation. Prior art arrangements have included having the spindle in bearings at each of its ends, as well as in silicone damping devices. This arrangement has proved unsatisfactory because of wear on the bearings as well as an inadequate damping effect on the needle pointer.

The present invention provides for damping of unwanted needle oscillation through the use of a specially machined pointer hub and hairspring attached to the spindle and hub.

Figure 1:
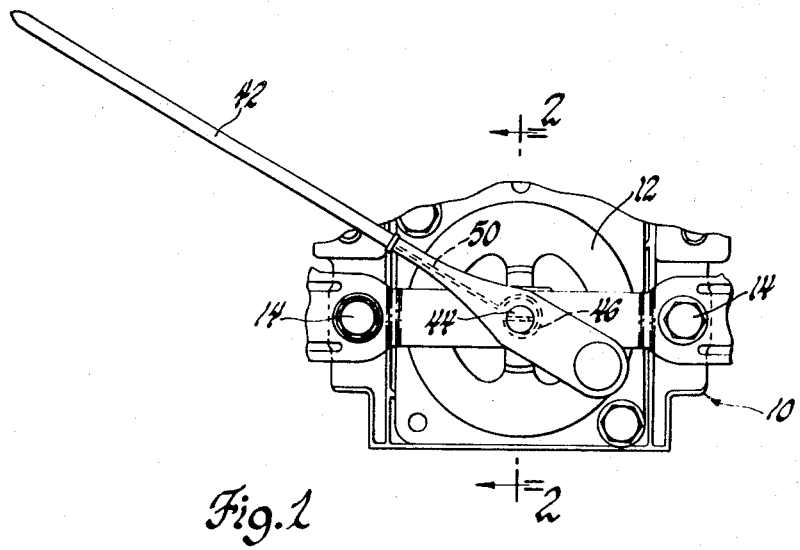
FIG. 1 is a front view of a speedometer incorporating the principles of the present invention.
Figure 3:
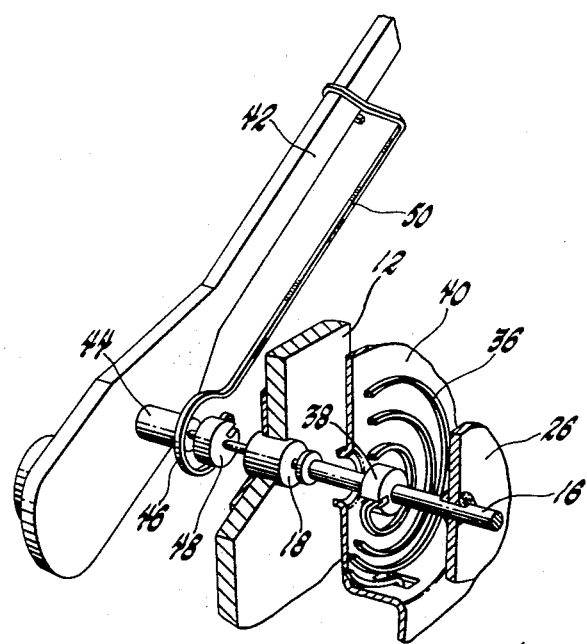
FIG. 3 is a perspective view more clearly showing the damping member connected to the spindle and pointer needle.
Figure 2:
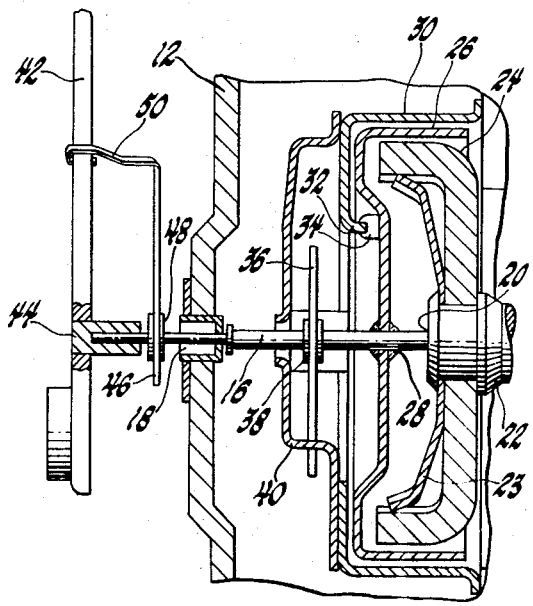
FIG. 2 is a fragmentary view taken substantially along the line 2—2 in FIG. 1.

Referring to FIG. 1, there is shown a speedometer well known in the art having a frame 10. An end plate 12 is joined to the frame 10 by means of bolts 14 to make up an instrument casing. As shown in FIG. 2, a spindle 16 driven by a flexible cable (not shown) is conventionally journaled as at 18 and 20 in the end plate 12 and drive shaft 22. A U-shaped magnet 24 is secured to the end of shaft 22 in any suitable manner as by spinning over shaft 22 onto a clip 23. A speed cup 26 is fixed to the spindle 16 in any suitable manner as by welding at 28.

Surrounding the speed cup is a plate member 30 affixed to the casing and having a fixed stop portion 32 to engage the limit stop 34 formed on the speed cup at the zero position of the pointer. A biasing spring 36 is attached to a hub 38 on the spindle and has the opposite end attached to an adjustable bridge portion 40 which is secured to the instrument casing through plate member 30. Adjustment of the bridge 40 varies the torsion-resisting force in the spring 36.

A pointer 42 is positioned at the end of the spindle opposite the drive shaft 22 by a specially machined hub 44 on the pointer 42, Hub 44 is machined so as to permit free rotation of spindle 16 therein. A hairspring 46 is attached at one end to the spindle by means of the hub 48 and at the other end to the pointer. More specifically, the spring has an elongated arm 50 which is attached to the pointer 42 a distance away from the spindle.

The operation of a magnetic-type speedometer is well known in the art. However, as previously pointed out, such a magnetic speedometer is subject to undesired oscillations and vibrations at the pointer. By use of a light hairspring member 48 at the end of the spindle 16 forming a second order damping system having its own natural frequency, transmission of undesired oscillations and vibrations set up in the pointer will be damped out. This second order natural frequency is low with respect to the natural frequency of the magnet. Therefore, the hairspring 46 as attached to and operating in conjunction with the pointer 42 will damp out any undesired natural frequencies of the magnet which tend to set up oscillations in the pointer.

The primary benefit gained is reduced pointer oscillations for a given degree of excitation. This permits greater manufacturing tolerances.

I claim:

1. In a speedometer having a casing, a spindle journaled in said casing, a biasing spring having one end attached to the instrument casing and the other end attached to said spindle, a magnet mounted for rotation about said spindle, a speed cup mounted on said spindle and surrounding said magnet, said speed cup and magnet arranged so the magnet, upon being rotated by a drive cable, drives said speed cup and spindle against said biasing spring to move a pointer wherein the improvement comprises:

a second spring member attached to a first hub integrally mounted to said spindle rearwardly of the end thereof, and fixedly attached to said pointer a substantial distance from said first hub by means of an elongated arm that is parallel to said pointer and integral with said second spring, said pointer being mounted on a free rotational second hub at the end of said spindle forward of said first hub and which is held in place at the end of said spindle for free rotational movement with respect thereto by action of said elongated arm and second spring member, wherein said second spring member and free rotational hub having said pointer thereon absorb and dampen out second-order oscillations that are caused by magnet and drive cable oscillations being transmitted through said spindle to said pointer, at said pointer by the free-floating movement action of said spring mounted pointer on said second hub.